United States Patent Office 3,321,541
Patented May 23, 1967

3,321,541
LIQUID POLYMERS OF BUTADIENE AND STYRENE HAVING A PREDOMINANTLY 1,4-CIS STRUCTURE
Bernhard Schleimer and Heinrich Weber, Marl, Germany, assignors to Chemische Werke Huls Aktiengesellschaft, Marl, Germany
No Drawing. Filed Sept. 22, 1964, Ser. No. 398,415
Claims priority, application Germany, Sept. 25, 1963, C 30,966
7 Claims. (Cl. 260—669)

This invention relates to liquid, low molecular weight polymers of butadiene and styrene having a predominantly 1,4-cis structure, and to a process for their production.

It is known to polymerize mixtures of butadiene and styrene to liquid, low-molecular reaction products having molecular weights down to about 500. Among the catalysts used for this purpose are alkali metals, optionally modified by the addition of ether; organic alkali metal compounds, such as lithium butyl; $BF_3$-etherates; $BF_3$ by itself; and free radical initiators; such as cumene hydroperoxide and tert. butyl hydroperoxide. These butadiene/styrene copolymers contain rather large proportions of vinyl double bonds. Additionally, in the polymers produced by cationic catalysts, such as $BF_3$-etherate, a portion of the theoretically possible double bonds is consumed on account of cyclization and cross linking reactions.

An object of this invention, therefore, is to provide liquid, low molecular weight butadiene-styrene copolymers having a high content of double bonds, particularly those double bonds having a 1,4-cis structure.

Another object is to provide a process for the production of these polymers.

Upon further study of the specification and claims, other objects and advantages of the present invention will become apparent.

To achieve these objects, it has been discovered that it is possible to polymerize mixtures of butadiene and styrene in the presence of diluents and organometallic mixed catalysts so that liquid, low molecular weight polymers result having molecular weights as low as about 500 and viscosities as low as approximately 50 centipoises, measured at 50° C., if, as the mixed catalysts, compounds are used of nickel, and alkyl aluminum halogenides of the formula $$R_nAlX_{(3-n)}$$

wherein

R=alkyl- or alkylaryl-residues of 1–12 carbon atoms, or hydrogen
X=a halogen, and
n=a number between 1 and 2, inclusive.

Among the alkyl aluminum halogenides are dialkyl aluminum halogenides, alkyl aluminum dihalogenides, as well as their mixtures, such as, for example, alkyl aluminum sesquihalogenide. The halogen is preferably chlorine, bromine, or iodine. Suitable alkyl aluminum sesquichlorides are, for example, methyl, ethyl, propyl, n-butyl, isobutyl, 2-ethyl-hexyl, and dodecyl aluminum sesquichloride, -bromide, or -iodide; likewise, the corresponding alkyl aluminum dihalogenides and dialkyl aluminum halogenides can be employed. Also suitable are mixtures of the mentioned compounds with one another or with trialkyl aluminum or trialkylaryl aluminum compounds, or with aluminum trihalogenides, as long as the average number of the halogen atoms per aluminum atom and thus also the number of the alkyl or alkylaryl groups in these mixtures is a number within the limits between 1 and 2, inclusive. Typical examples of alkylaryl groups in the preceding compounds are methylphenyl-, ethylphenyl- and isopropylphenyl-groups.

Additional suitable catalyst mixtures are aluminum hydrides, for example in the form of the lithium aluminum hydride or the sodium aluminum hydride in mixture with the afore-mentioned halogen-containing alkyl aluminum compounds. Finally, it is also possible to use aluminum hydride halogenides and their etherates, for example aluminum hydride chloride etherate by itself or mixed with the above-mentioned aluminum compounds.

With respect to nickel (II) compounds, it is contemplated that all types of compounds are operable. Suitable nickel compounds are, for example, inorganic salts, such as the halogenides, which are preferably treated so that they are soluble in inert hydrocarbons. This treatment can be effected with the aid of primary, secondary, or tertiary aliphatic, as well as aromatic, saturated as well as unsaturated alcohols or amines, for example, allyl alcohol and pyridine, furthermore with the aid of ketones and ethers, such as, for example, dioxane, furfuryl alcohol, tetrahydrofuran, or with the aid of other complex-forming agents or heterocyclics.

Advantageously, however, nickel compounds are used which are themselves soluble in inert diluents, for example the salts of organic acids, such as nickel acetate, butyrate, octoate, stearate, and naphthenate; furthermore complex-compounds, such as nickel acetyl acetonate, nickel dibenzoyl acetonate, and bis-cyclopentadienyl nickel.

For inert diluents, there are suitably used aliphatic, cycloaliphatic, and aromatic hydrocarbons, such as, for example, butane, pentane, hexane, cyclohexane, isopropyl cyclohexane, benzine fractions, benzene, toluene, and similar compounds. Likewise, mixtures of these solvents can be employed. Suitable compounds also include halogenated hydrocarbons, such as chlorobenzene and tetrachloroethylene.

The inert diluents are used in gravimetric quantities, which are about 0.1–20 times, preferably 0.5–5 times, and approximately equal to, or double the quantity of, the sum of the butadiene and styrene.

In the mixed catalysts, for each mol of the aluminum compound, there should be preferably between about 0.0005 to 1.0, normally between 0.01 to 0.25 mol of the nickel compound. The aluminum compound, for example ethyl aluminum sesquichloride, is preferably employed in quantities of about 0.0001 to 0.1 mol, preferably 0.002 to 0.02 mol, based on 100 g. of the butadiene-styrene monomer. The mol ratio of butadiene/styrene as raw materials is preferred to be between 0.01:1 to 1:0.01.

Aside from styrene, its derivatives can also be used, such as o-, m-, and p-alkyl styrene, o-, m-, and p-halostyrenes, particularly chlorostyrene, the corresponding dialkyl styrenes, furthermore divinyl benzene, allyl benzene, o-, m-, and p-diallyl benzene, and similar compounds. In all of the latter compounds, alkyl preferably contains 1 to 10 carbon atoms.

The polymerization is suitably conducted at room temperature. However, it can also be accomplished at higher or lower temperatures in the range of −30° to +100° C. Normally, though pressure can be varied from vacuum to superatmospheric, the operation is conducted at atmospheric pressure, or at an excess pressure up to 10 atmospheres, gauge, the latter being particularly advantageous in case the reaction temperature exceeds 40° C.

In the polymerization process, it has been found to be advantageous to add the butadiene in gaseous form continuously and to supply the styrene in conjunction with the solvent. The latter, however, can also be fed continuously. A discontinuous supply of both monomers to the reaction enviroment is likewise possible.

The process is suitably conducted in an atmosphere which is inert to the reaction components, such as nitrogen, the rare gases, or methane.

The regulation of the molecular weight is primarily accomplished by varying the Al/Ni ratio. The average molecular weight increases with an increasing Al/Ni ratio. Further influencing the average molecular weights are the catalyst concentration, the butadiene/styrene ratio, the polymerization temperature, and the diluent. For example, diluent mixtures of inert aliphatic and inert aromatic hydrocarbons, for example benzene/pentane, toluene/pentane, benzene/hexane mixtures, yield lower average molecular weights than the pure diluents. Finally, the purity of the monomers used also influences the average molecular weight of the polymers. If the employed butadiene-(1,3) contains additionally acetylenes or allenes, such as, for example, butyne-(1), butyne-(2), propadiene, and butadiene-(1,2), decreasing molecular weights result with an increasing concentration of these compounds. These substances can also be added to the monomers in order to regulate the molecular weights, if desired. For this purpose, acetylenes can also be employed which are not normally contained in commercial butadiene, such as phenylacetylene or diacetylene. Additional regulators include ketones, amines, or nitriles, such as, for example, acrylonitrile, acetonitrile, likewise alkyl halogenides or alkenyl halogenides, such as, for example, allyl chloride.

The obtained reaction mixtures are worked up in a conventional manner by decomposing the mixed catalyst with the aid of water, alcohols, ketones, or complex-forming agents and by distilling off the diluent or removing the diluent with steam. Subsequently, the catalyst residues can be removed by washing the reaction product with water, to which can be added, if desired, inorganic or organic bases or acids, or by washing with alcohols, such as methanol or isopropyl alcohol. It is also possible to wash the reaction solution with water first, and then to distill off the organic diluent in vacuum or eliminate the organic diluents with steam.

The liquid, low-molecular butadiene/styrene polymers are freed from residual diluents, alcohol, or water by vacuum drying, at room temperature or slightly elevated temperature. A further method of working up the product comprises precipitating the low-molecular polymer by means of alcohol, for example methanol, and simultaneous elimination of the catalyst residues by stirring, separation of the heavier liquid polymer phase, and subsequent drying of the reaction product in vacuum at temperatures up to about 100° C. For removing the residual diluent, the water, and the alcohol, a thin-film evaporator is advantageous.

The polymerization, and the working up of the product, can also be advantageously carried out in a continuous manner.

The low-molecular liquid butadiene/styrene polymers of this invention have average molecular weights of between about 500 and 50,000, and viscosities of between 50 and 15,000 centipoises, measured at 50° C. At least 95% of the olefinic double bonds in the polymer are in the central position, of which, in turn, at least 75% of the olefinic double bonds are present as cis-double bonds, and the vinyl double bonds are present at a maximum quantity of up to 3% of the olefinic double bonds. The remainder of the double bonds are trans-double bonds. The content of olefinic double bonds in the polymers varies—in correspondence with the iodine numbers characteristc for them—between about 65% and 98% of theoretical based on the styrene content. Depending upon the butadiene-styrene proportions chosen for the polymerization, the copolymers contain 0.5 to 30 percent by weight of styrene, and correspondingly 70 to 99.5 percent by weight of butadiene.

The low-molecular liquid butadiene/styrene polymers of this invention are useful for many technical purposes, for example as softeners for rubber, such as styrene/butadiene rubber, for the production of adhesives, films, coatings, and moldable materials which are hardenable by cross linking, and as drying oils and/or as admixture to drying oils.

The polymers are also very useful intermediates. The central-position olefinic cis- and trans-double bonds are readily epoxidized; they are capable of adding halogens and hydrogen halides, are hydrogenizable, and yield diene- and ene-synthesis.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

Under the exclusion of molecular oxygen and moisture, 5 millimols nickel-(II)-diacetyl acetonate and 40 millimols ethyl aluminum sesquichloride are fed to a nitrogen-purged reaction flask filled with 1000 ml. benzene, this being done at room temperature. At 0° C., 83.2 g. (0.8 mol) styrene are rapidly added, under stirring, and 432 g. (8 mols) butadiene-(1,3), in gaseous form, are continuously added during a period of 5 hours; this butadiene-(1,3) has a purity of 98.7 mol percent, the controlling impurities being 0.06 mol percent butadiene-(1,2) and 0.03 mol percent allene, additional impurities being 0.16 mol percent propylene, 0.92 mol percent butene-(1) and isobutene, and 0.11 mol percent trans- and cis-butene-(2).

After 6 hours, the polymerization is stopped by inactivating the catalyst with 50 ml. methanol. By adding further methanol, the benzenic reaction solution is divided, specific-gravity-wise, into a lighter benzene-methanol phase and a heavier liquid butadiene/styrene polymer phase. The latter is separated and washed three times with respectively 1000 ml. methanol in order to remove the catalyst residues. The butadiene-styrene polymer is then freed from residual methanol and benzene in a thin-film evaporator at 100° C. and 20 torrs.

There are obtained 375 g. (73% of theory) of a water-clear, liquid butadiene-styrene polymer having a molecular weight of 5000 (light scattering method), a viscosity of 340 centipoises, measured at 50° C., a density (50/4) of 0.9012, a refractive index $n_D^{20}$ of 1.5299. The iodine number is 390. According to IR-analysis, the polymer contains 6 percent by weight of styrene and 94 percent by weight of butadiene. The olefinic double bonds are present with 83% as cis-double bonds, with 16% as trans-double bonds, and with 1% as vinyl double bonds.

*Examples 2, 3, 4, and 5*

The following table of Examples 2 to 5 shows the dependency of the viscosity, the molecular weight, and the styrene content upon the aluminum/nickel proportion in the mixed catalyst, if the process is otherwise carried out as described in Example 1.

TABLE I

| Ex. | Ethyl Aluminum Sesquichloride, millimols | Nickel-(II)-diacetyl Acetonate, millimols | Al/Ni Proportion | Yield, Percent | Molecular Weight | Viscosity, cp., 50° C. | Density, 50/4 | Iodine Number | Styrene, Percent by Weight | Double Bonds in Percent | | |
|---|---|---|---|---|---|---|---|---|---|---|---|---|
| | | | | | | | | | | Cis | Trans | Vinyl |
| 2 | 40 | 2.5 | 16:1 | 77.8 | 10,000 | 420 | 0.9031 | 413 | 6 | 85 | 14 | 1 |
| 3 | 40 | 1.0 | 40:1 | 65 | 22,000 | 2,220 | 0.9015 | 426 | 6 | 89 | 10 | 1 |
| 4 | 40 | 0.5 | 80:1 | 66 | 36,000 | 9,360 | 0.9005 | 430 | 5 | 87 | 10 | 3 |
| 5 | 40 | 0.25 | 100:1 | 56 | 48,000 | 14,500 | 0.8993 | 432 | 5 | 90 | 8 | 2 |

Example 6

Under the exclusion of molecular oxygen and moisture, 10 millimols nickel-(II)-diacetyl acetonate and 40 millimols ethyl aluminum dichloride are fed into a reaction flask which is filled with 1000 ml. benzene and purged with nitrogen, this being done at room temperature. At 0° C., 83.2 g. (0.8 mol) styrene are added all at once under stirring, and 432 g. (8 mols) butadiene-(1,3) in the gaseous form of the quality set forth in Example 1 are continuously added within a period of 5 hours.

After 6 hours, the polymerization is stopped by inactivating the catalyst with 50 ml. methanol, and the polymer is worked up as described in Example 1.

390 g. (75.5% of theory) of a water-clear, viscous butadiene-styrene polymer are obtained having a molecular weight of 14,000 (light scattering method), a viscosity of 1820 centipoises, measured at 50° C., a density (50/4) of 0.8983, and a refractive index $n_D^{20}$ of 1.5290. The iodine number is 415. According to IR-analysis, the polymer contains 5 percent by weight of styrene and 95 percent by weight of butadiene. The olefinic double bonds are present with 89% as cis-double bonds, with 10% as trans-double bonds, and with 1% as vinyl double bonds.

Example 7

Under the exclusion of molecular oxygen and moisture, 10 millimols nickel-(II)-diacetyl acetonate and 40 millimols ethyl aluminum sesquichloride are fed to a nitrogen-purged reaction flask filled with 750 ml. benzene and 250 ml. pentane, this being done at room temperature. At 0° C., under stirring, there are added in gaseous form, within 5 hours, 432 g. (8 mols) butadiene-(1,3), the latter containing, at a purity of 99.0 mol percent, as controlling impurities 0.03 mol percent butadiene-(1,2) and 0.05 mol percent allene, and as additional impurities 0.24 mol percent propylene, 0.55 mol percent butene-(1) and isobutene, and 0.06 mol percent trans- and cis-butene-(2). Simultaneously with the addition of the butadiene, 83.2 g. (0.8 mol) styrene are continuously added, dropwise, during this period. After 6 hours, the polymerization is stopped by inactivating the catalyst with 50 ml. methanol, and the reaction product is worked up as described in Example 1.

385 g. (75% of theory) of a water-clear liquid butadiene-styrene polymer are obtained having a molecular weight of approximately 3,500 (light scattering method), a viscosity of 163 centipoises, measured at 50° C., a density (50/4) of 0.8956, and a refractive index $n_D^{20}$ of 1.5292. According to IR-analysis, the polymer contains 5 percent by weight of styrene and 95 percent by weight of butadiene. The olefinic double bonds are present with 81% as cis-double bonds, with 18% as trans-double bonds, and with less than 1% as vinyl double bonds.

Example 8

Under the exclusion of molecular oxygen and moisture, 15 millimols nickel-(II)-diacetyl acetonate and 60 millimols ethyl aluminum sesquichloride are fed to a reaction flask which is filled with 750 ml. benzene and 250 ml. pentane and is purged with nitrogen, this being done at room temperature. At 0° C., there are then added simultaneously and under stirring, within 5 hours, 216 g. (4 mols) butadiene-(1,3) of the quality set forth in Example 1, in gaseous form, and 208 g. (2 mols) styrene are also added continuously and dropwise. After 6 hours, the polymerization is stopped by inactivating the catalyst with 50 ml. methanol, and the diluents and the unreacted styrene are driven off by means of steam. The residue is separated from the water and stirred three times with respectively 1000 ml. methanol in order to remove the catalyst residues. The butadiene-styrene polymer is finally freed from residual methanol in a thin-film evaporator at 100° C. and 20 torrs.

210 g. (49.5% of theory) of a liquid polymer are obtained having a molecular weight of 8000 (light scattering method), a viscosity of 280 centipoises, measured at 50° C., a density (50/4) of 0.9461, and a refractive index $n_D^{20}$ of 1.5529. The iodine number is 285. According to IR-analysis, the polymer contains 16 percent by weight of styrene and 84 percent by weight of butadiene. The olefinic double bonds are present with 81% as cis-double bonds, with 17% as trans-double bonds, and with 2% as vinyl double bonds.

Example 9

The quantities and conditions set forth in Example 7 are maintained and only the reaction temperature is increased to 20° C.

200 g. (47.2% of theory) of a liquid butadiene-styrene polymer are obtained having a molecular weight of less than 5000 (light scattering method), a viscosity of 250 centipoises, measured at 50° C., a density (50/4) of 0.9471, and a refractive index $n_D^{20}$ of 1.5555. The iodine number is 268. According to IR-analysis, the polymer contains 76 percent by weight of butadiene and 21 percent by weight of styrene. The olefinic double bonds are constituted as 79% as cis-double bonds, 19% as trans-double bonds, and 2% as vinyl double bonds.

Example 10

Under the exclusion of molecular oxygen and moisture, 7.5 millimols nickel-(II)-diacetyl acetonate and 60 millimols ethyl aluminum sesquichloride are fed to a nitrogen-purged reaction flask filled with 750 ml. benzene and 250 ml. pentane. At 20° C. there are added simultaneously and continuously within 5 hours, under stirring, 216 g. (4 mols) butadiene-(1,3) in gaseous form containing the impurities mentioned in Example 1, and 208 g. (2 mols) styrene, the latter being added in a dropwise manner. After 6 hours, the polymerization is stopped by inactivating the catalyst with 50 ml. methanol, and the diluents and the unreacted styrene are driven off by means of steam. The residue is separated from the water and stirred three times with 1000 ml. methanol, respectively, for removing the catalyst residues. The butadiene/styrene polymer is finally freed from residual methanol in an evaporator at 100° C. and 20 torrs.

300 g. (70.7% of theory) of a viscous polymer are obtained having a molecular weight of 10,000 (light scattering method), a viscosity of 1,250 centipoises, measured at 50° C., a density (50/4) of 0.9646, and a refractive index $n_D^{20}$ of 1.5636. The iodine number is 233. According to IR-analysis, the polymer contains 73 percent by weight of butadiene and 27 percent by weight of styrene. The olefinic double bonds are present with 79% as cis-double bonds, with 18% as trans-double bonds, and with 3% as vinyl double bonds.

In Table II, as follows, there is presented a summary of the properties of the polymers produced by Examples 1 through 10.

TABLE II

| Example | Molecular Weight | Viscosity (centipoises) | Proportion | | Iodine Number | | Theoretically Possible Olefin Double Bond, percent | Proportion of Double Bonds, Percent | | |
|---|---|---|---|---|---|---|---|---|---|---|
| | | | Styrene, percent by weight | Butadiene, percent by weight | Found | Calculated | | Cis | Trans | Vinyl |
| 1 | 5,000 | 340 | 6 | 94 | 390 | 438 | 89 | 83 | 16 | 1 |
| 2 | 10,000 | 420 | 6 | 94 | 413 | 438 | 94.3 | 85 | 14 | 1 |
| 3 | 22,000 | 2,220 | 6 | 94 | 426 | 438 | 97.2 | 89 | 10 | 1 |
| 4 | 36,000 | 9,360 | 5 | 95 | 430 | 447 | 96.2 | 87 | 10 | 3 |
| 5 | 48,000 | 14,500 | 5 | 95 | 432 | 447 | 96.6 | 90 | 8 | 2 |
| 6 | 14,000 | 1,820 | 5 | 95 | 415 | 447 | 92.8 | 89 | 10 | 1 |
| 7 | 3,500 | 163 | 5 | 95 | 427 | 447 | 95.5 | 81 | 18 | <1 |
| 8 | 8,000 | 280 | 16 | 84 | 285 | 393 | 72.5 | 81 | 17 | 2 |
| 9 | <5,000 | 250 | 21 | 79 | 268 | 370 | 77.0 | 79 | 19 | 2 |
| 10 | 10,000 | 1,250 | 27 | 73 | 233 | 343 | 67.9 | 79 | 18 | 3 |

It is seen from this table that the properties of the polymers according to the examples can range within the following limits:

(1) Molecular weight between 3,500 and 48,000.
(2) Viscosity between 163 and 14,500 centipoises.
(3) Styrene contents between 5 and 27 percent by weight.
(4) Butadiene contents between 73 and 95 percent by weight.
(5) Iodine number between 233 and 432.
(6) Contents, in percent, of the theoretically possible olefinic double bonds, calculated from the ratio of the found iodine number over the calculated iodine number, and based on the styrene contents, between 67.9 and 97.2.
(7) Proportion of cis-double bonds, between 79 and 90%.
(8) Proportion of trans-double bonds, between 8 and 19%.
(9) Proportion of vinyl double bonds, less than 1 to 3%.

The preceding examples can be repeated by substituting the various different reactants, catalysts, and operating conditions both generically and specifically set forth in the description of this invention, thereby providing polymers having properties substantially similar to those in Table II, but with deviations as set forth in the generic description of the polymer.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of liquid copolymers of butadiene/styrene having at least 75% cis-double bonds and a molecular weight between 500 and 50,000, which process comprises copolymerizing, at —30° to +100° C. in an inert atmosphere, butadiene and styrene monomers, present in a mol ratio of 0.01:1 to 1:0.01, in contact with a catalyst consisting essentially of:

(a) an alkyl aluminum halogenide of the formula

$$R_nAlX_{(3-n)}$$

wherein
R is selected from the group consisting of alkyl of 1–2 carbon atoms and hydrocarbon alkylaryl of 1–12 carbon atoms, and hydrogen
X is halogen, and
n is a number from 1 to 2, inclusive,
said alkyl aluminum halogenide being present in proportions of about 0.0001 to 0.1 g. mol per 100 g. of butadiene/styrene monomer;

(b) a nickel compound soluble in an inert diluent in a concentration of about 0.0005 to 1.0 g. mol per g. mol of said aluminum alkyl halogenide, and (c) the inert diluent in (b) being present in proportions of 0.1 to 20 times the quantity of butadiene/styrene.

2. The process of claim 1 wherein the nickel compound is nickel-(II)-diacetyl acetonate.

3. The process of claim 2 wherein the aluminum alkyl halogenide is ethyl aluminum sesquichloride.

4. The process of claim 1 wherein the nickel compound is present in proportions of about 0.01 to 0.25 per mol of aluminum alkyl halogenide.

5. The process of claim 1 wherein the aluminum alkyl halogenide is present in proportions of about 0.002 to 0.02 g. mol per 100 g. of butadiene/styrene monomer.

6. A copolymer of butadiene and styrene, the polymerized product having the following properties:
(a) Molecular weight, 500–50,000;
(b) Viscosity at 50° C., 50–15,000 centipoises;
(c) Weight percent styrene, 0.5–30;
(d) Weight percent butadiene, 99.5–70;
(e) Iodine number, 233–432;
(f) Content in percent of the theoretically possible double bonds, calculated from the ratio of the empirical iodine number over the calculated iodine number, ang based on the styrene content, 65–98;
(g) Proportion of cis-double bonds, at least 75 percent; and
(h) Proportion of vinyl double bonds, up to 3 percent.

7. A copolymer of butadiene and styrene, the polymerized product having the following properties:
(a) Molecular weight, 3,500–48,000;
(b) Viscosity at 50° C., 163–14,500 centipoises;
(c) Weight percent styrene, 5–27;
(d) Weight percent butadiene, 95–73;
(e) Iodine number, 233–432;
(f) Content in percent of the theoretically possible double bonds, calculated from the ratio of the empirical iodine number over the calculated iodine number, and based on the styrene content, 67.9–97.2;
(g) Proportion of cis-double bonds, 79–90 percent; and
(h) Proportion of vinyl double bonds, up to 3 percent.

References Cited by the Examiner
UNITED STATES PATENTS 2,649,425  8/1953  Hulse _____ 260—84.1 X
2,962,488  11/1960  Horne _____ 260—94.7
2,977,349  3/1961  Brockway et al. _____ 260—94.3
3,005,811  10/1961  Youngman _____ 260—94.3

DELBERT E. GANTZ, *Primary Examiner.*

C. R. DAVIS, *Assistant Examiner.*